(12) United States Patent
Jenkins

(10) Patent No.: US 7,546,320 B2
(45) Date of Patent: Jun. 9, 2009

(54) COMPUTER IMPLEMENTED METHOD, SYSTEM AND PROGRAM PRODUCT FOR REVIEWING A MESSAGE ASSOCIATED WITH COMPUTER PROGRAM CODE

(75) Inventor: Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/681,910

(22) Filed: Oct. 9, 2003

(65) Prior Publication Data

US 2005/0080790 A1     Apr. 14, 2005

(51) Int. Cl.
*G06F 12/00* (2006.01)
(52) U.S. Cl. .................. 707/201; 707/8; 707/6
(58) Field of Classification Search .................. 707/10, 707/104.1, 100, 5, 3, 201, 6, 8
See application file for complete search history.

(56) References Cited

U.S. PATENT DOCUMENTS

| | | | | |
|---|---|---|---|---|
| 4,888,690 | A * | 12/1989 | Huber ............................. 707/4 |
| 5,047,977 | A * | 9/1991 | Hill et al. ...................... 714/57 |
| 5,287,444 | A * | 2/1994 | Enescu et al. ................ 715/234 |
| 5,297,038 | A * | 3/1994 | Saito ............................... 707/1 |
| 5,521,816 | A * | 5/1996 | Roche et al. .................... 704/9 |
| 5,566,291 | A * | 10/1996 | Boulton et al. .............. 715/709 |
| 5,583,983 | A * | 12/1996 | Schmitter ..................... 717/138 |
| 5,673,390 | A * | 9/1997 | Mueller ........................ 714/57 |
| 5,771,385 | A * | 6/1998 | Harper ........................ 717/128 |
| 5,852,825 | A * | 12/1998 | Winslow ........................ 707/6 |
| 5,892,898 | A * | 4/1999 | Fujii et al. .................... 714/57 |
| 5,909,570 | A | 6/1999 | Webber |
| 6,026,416 | A * | 2/2000 | Kanerva et al. ............. 715/208 |
| 6,044,387 | A * | 3/2000 | Angiulo et al. ............. 715/257 |
| 6,061,152 | A * | 5/2000 | Nihei et al. .................. 358/448 |
| 6,092,037 | A * | 7/2000 | Stone et al. .................... 704/8 |
| 6,115,544 | A * | 9/2000 | Mueller ........................ 714/57 |
| 6,119,079 | A * | 9/2000 | Wang et al. .................... 704/8 |
| 6,253,369 | B1 * | 6/2001 | Cloud et al. ................ 717/136 |
| 6,256,676 | B1 | 7/2001 | Taylor et al. |
| 6,334,193 | B1 * | 12/2001 | Buzsaki ......................... 714/2 |
| 6,470,363 | B1 * | 10/2002 | Kanerva et al. ............. 715/208 |
| 6,473,896 | B1 * | 10/2002 | Hicken et al. ............... 717/132 |
| 6,502,102 | B1 * | 12/2002 | Haswell et al. ............. 707/102 |
| 6,526,127 | B1 * | 2/2003 | Piotrowski et al. ....... 379/88.22 |
| 6,565,608 | B1 * | 5/2003 | Fein et al. ................... 715/255 |
| 6,574,792 | B1 * | 6/2003 | Easton ....................... 717/142 |
| 6,609,128 | B1 | 8/2003 | Underwood |
| 6,718,535 | B1 * | 4/2004 | Underwood ................ 717/101 |
| 6,732,153 | B1 * | 5/2004 | Jakobson et al. ............ 709/206 |
| 6,748,582 | B1 * | 6/2004 | Chiles et al. ................ 717/111 |
| 6,757,889 | B1 * | 6/2004 | Ito .............................. 717/112 |

(Continued)

*Primary Examiner*—Hosain T Alam
*Assistant Examiner*—Leon J Harper
(74) *Attorney, Agent, or Firm*—A. Bruce Clay; Hoffman Warnick LLC

(57) ABSTRACT

Under the present invention, a review standard for reviewing a message is first configured. The review standard can be based on a stored resource containing review parameters, manually designated review parameters, or both. When a message is created or edited, the message is reviewed based on the review standards and corresponding notifications can be communicated. Any errors that are detected are presented to provide an opportunity for correction. The system also allows messages to be deleted and corresponding notifications to be communicated.

32 Claims, 10 Drawing Sheets

U.S. PATENT DOCUMENTS

| | | | |
|---|---|---|---|
| 6,907,546 B1 * | 6/2005 | Haswell et al. | 714/38 |
| 6,978,443 B2 * | 12/2005 | Flanagan et al. | 717/127 |
| 6,983,446 B2 * | 1/2006 | Charisius et al. | 717/113 |
| 7,194,684 B1 * | 3/2007 | Shazeer | 715/205 |
| 7,243,103 B2 * | 7/2007 | Murphy et al. | 707/10 |
| 7,315,979 B1 * | 1/2008 | Walker | 715/234 |
| 7,333,233 B2 * | 2/2008 | Gauthier | 358/1.18 |
| 7,464,336 B2 * | 12/2008 | Nakamoto et al. | 715/705 |
| 7,478,364 B2 * | 1/2009 | Jenkins | 717/110 |
| 2002/0120918 A1 * | 8/2002 | Aizenbud-Reshef et al. | 717/127 |
| 2002/0165885 A1 * | 11/2002 | Kumhyr et al. | 707/536 |
| 2003/0041180 A1 * | 2/2003 | Schlussman | 709/328 |
| 2003/0084041 A1 * | 5/2003 | Dettinger | 707/5 |
| 2004/0025192 A1 * | 2/2004 | Angel et al. | 725/139 |
| 2004/0111475 A1 * | 6/2004 | Schultz | 709/206 |
| 2004/0205661 A1 * | 10/2004 | Gallemore | 715/530 |
| 2005/0005258 A1 * | 1/2005 | Bhogal et al. | 717/102 |
| 2005/0055350 A1 * | 3/2005 | Werme et al. | 707/10 |

\* cited by examiner

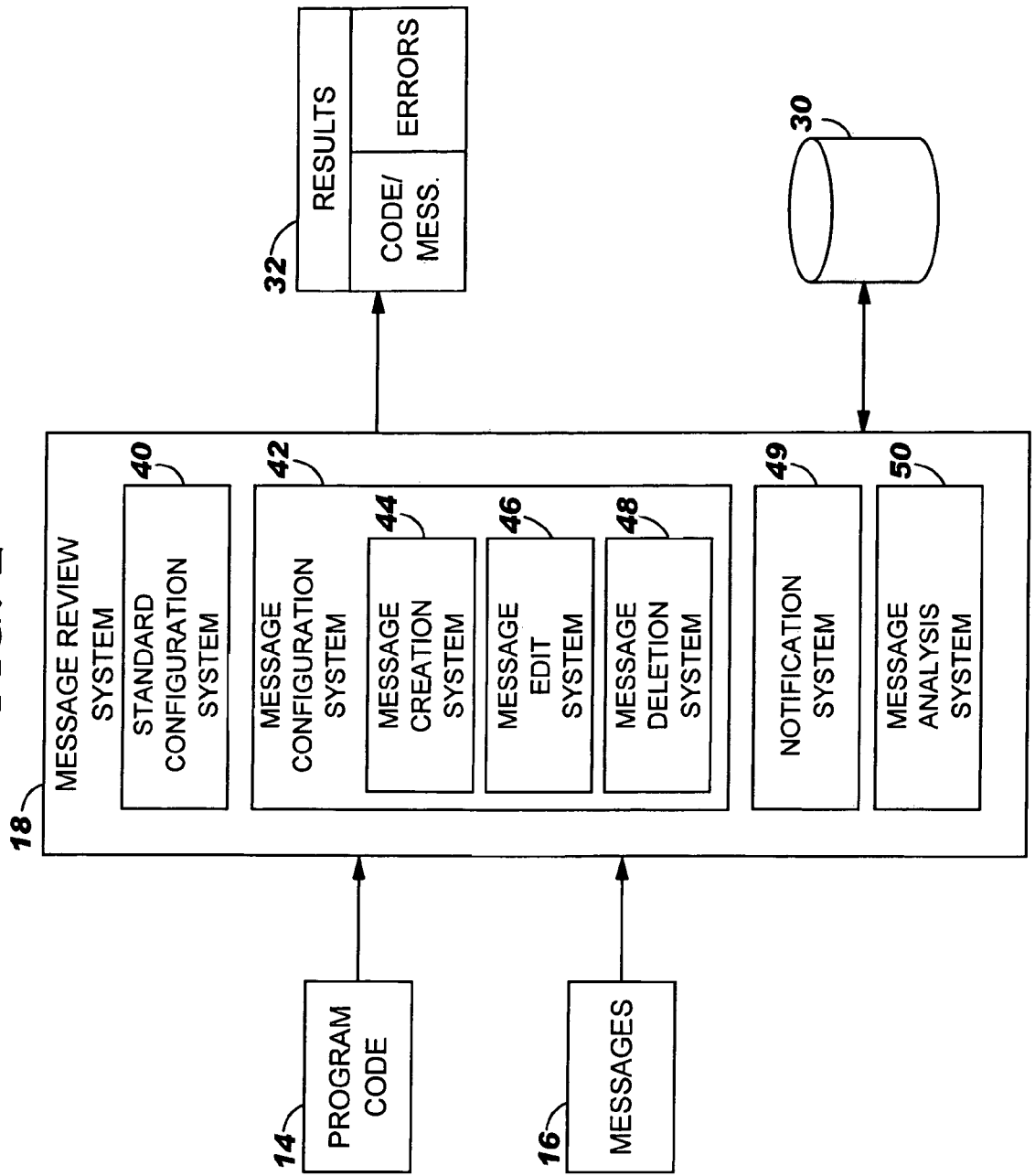

EDIT ROUTINE

REVIEW ROUTINE

COMPUTER IMPLEMENTED METHOD, SYSTEM AND PROGRAM PRODUCT FOR REVIEWING A MESSAGE ASSOCIATED WITH COMPUTER PROGRAM CODE

This application is related in some aspects to U.S. application Ser. No. 10/681,908, filed Oct. 9, 2003 and entitled "Computer-Implemented Method, System and Program Product for Determining a Message Quantity for Program Code," and to U.S. application Ser. No. 10/685,806, filed Oct. 15, 2003 and entitled "Computer-Implemented Method, System and Program Product for Analyzing Messages Associated with Computer Program Code."

BACKGROUND OF THE INVENTION

1. Field of the Invention

The present invention generally relates to a computer-implemented method, system and program product for reviewing a message associated with computer program code. Specifically, the present invention provides uniformity in messages that exist to support computer program code.

2. Related Art

As computers continue to become more integrated in everyday life, computer software continues to become more sophisticated. For example, today a computer user can prepare a tax return, pay bills, purchase goods or services, etc., from the comport of his/her personal computer. Such convenience is provided by various software packages. To this extent, computer program developers are constantly working to improve existing products, or introduce new products to the market.

In developing computer program code, a developer will usually include certain "messages" designed to support the product for the end-user. Typical messages that can be provided include error messages, warning messages and information messages. Although each of these messages serves a different purpose, they are usually necessary to fully support the program code being developed. Unfortunately, there is currently no uniformity in providing such messages. For example, a message for a particular purpose generated by developer "A" might include one line of text, while the same message generated by developer "B" might include four lines of text. Still yet, different developers might utilize different terminology or definitions when generating messages. This could be especially problematic when a single product is developed by multiple developers. Accordingly, there is currently no way to accurately predict the length or content of most messages.

As a result of this predicament, program integrated information (PII) counts are usually inaccurate and highly inflated to try to accommodate some unknown number. This raises various concerns since translation between languages is often necessary for a program. Specifically, it is common for a software product to be made available in multiple countries/regions of the world. As such, lingual translation of interfaces, messages and the like is necessary. The longer the messages that are utilized to support a program, the greater the translation costs. Thus, with no real control or uniformity over message development, translation costs for a program can be substantial and unpredictable.

In view of the foregoing, there exists a need for a computer-implemented method, system and program product for reviewing a message associated with computer program code. Specifically, a need exists for a system that can be configured for a particular review standard. A further need exists for a message to be reviewed for errors based on the review standard. Still yet, a need exists to clearly present any errors detected during the review process, and provide an opportunity to address the errors.

SUMMARY OF THE INVENTION

In general, the present invention provides a computer-implemented method, system and program product for reviewing a message associated with computer program code. Specifically, under the present invention, a standard for reviewing the message is first configured. The review standard can be based on a stored resource containing review parameters, manually designated review parameters, or both. When a message is created or edited, the message is reviewed based on the review standards. Any errors that are detected are presented to provide an opportunity for correction. The system also allows messages to be deleted and corresponding notifications to be communicated to appropriate parties.

A first aspect of the present invention provides a computer-implemented method for reviewing a message associated with computer program code, comprising: providing the message; configuring a review standard for reviewing the message; reviewing the message based on the review standard to detect errors; displaying any errors that are detected concurrently with the message; and revising the message to address the errors.

A second aspect of the present invention provides a computerized system for reviewing a message associated with computer program code, comprising: a message configuration system for configuring the message; a standard configuration system for configuring a review standard for reviewing the message; and a message analysis system for reviewing the message based on the review standard to detect any errors, and for displaying the errors if detected.

A third aspect of the present invention provides a program product stored on a recordable medium for reviewing a message associated with computer program code, which when executed, comprises: program code for configuring the message; program code for configuring a review standard for reviewing the message; and program code for reviewing the message based on the review standard to detect any errors, and for displaying the errors if detected.

Therefore, the present invention provides a computer-implemented method, system and program product for reviewing a message associated with computer program code.

BRIEF DESCRIPTION OF THE DRAWINGS

These and other features of this invention will be more readily understood from the following detailed description of the various aspects of the invention taken in conjunction with the accompanying drawings in which:

FIG. 2 depicts the message review system of FIG. 1 in greater detail.

Figure 1:
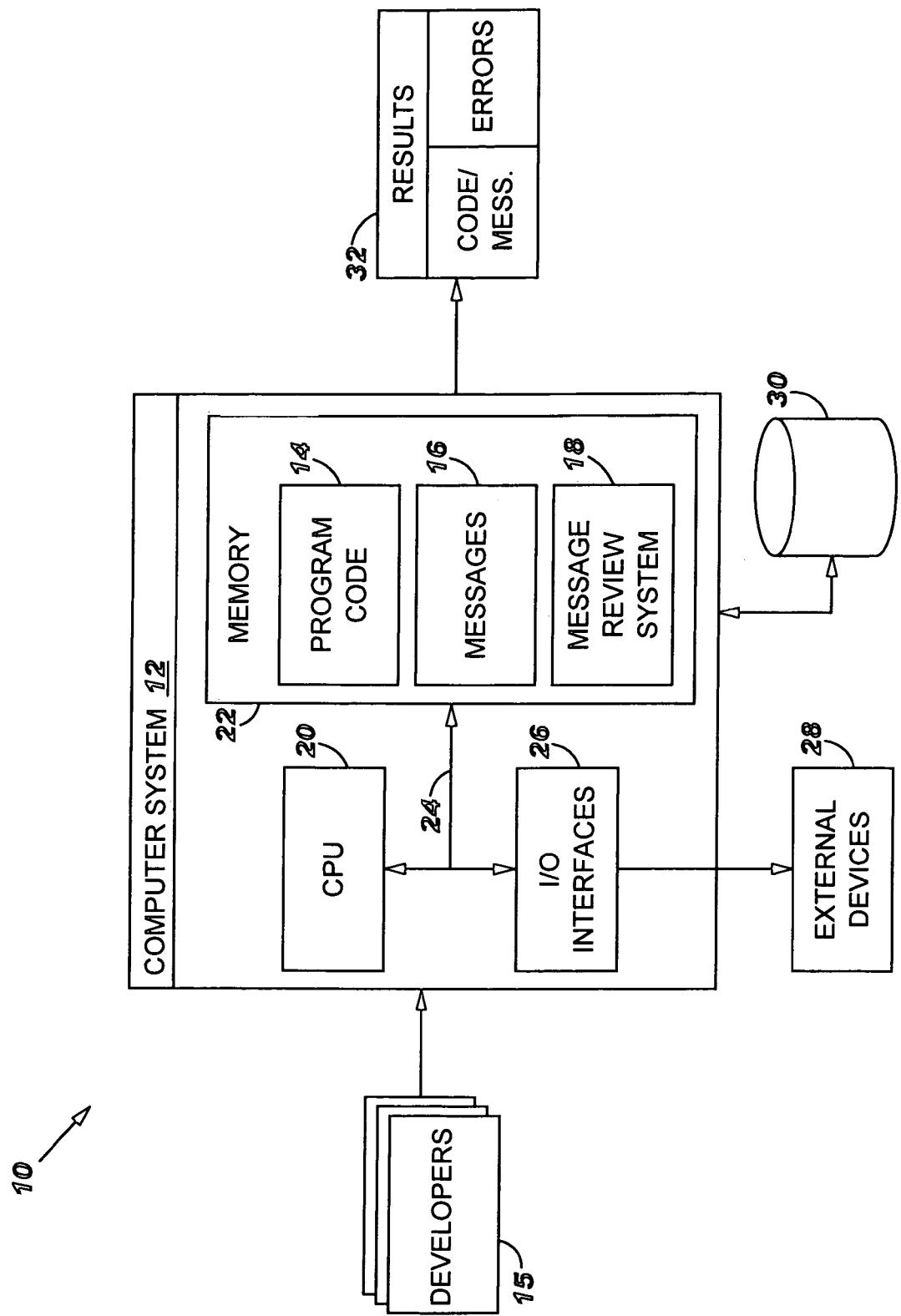
FIG. 1 depicts a system for reviewing a message associated with computer program code according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a computer-implemented method, system and program product for reviewing a message associated with computer program code. Specifically, under the present invention, a standard for reviewing the message is first configured. The review standard can be based on a stored resource containing review parameters, manually designated review parameters, or both. When a message is created or edited, the message is reviewed based on the review standards. Any errors that are detected are presented to provide an opportunity for correction. The system also allows messages to be deleted and corresponding notifications to be communicated to appropriate parties.

Referring now to FIG. 1, a system 10 for reviewing a message associated with computer program code is shown. As depicted, system 10 includes a computer system 12 that receives computer program code 14 (hereinafter simply referred to as "program code 14") and messages 16 as developed by one or more developers 15. As will be further described below, message review system 18 is an executable program or the like that analyzes messages 16 based upon message review standards to determine whether any errors are present therein; Any errors that are present could be displayed to the developers 15 (and concurrently with the message and/or associated program code) in a result interface 32. This provides the developers 15 with an opportunity to address the errors.

It should be understood that computer system 12 is intended to represent any type of computerized device capable of executing programs and performing the functions described herein. For example, computer system 12 could be a personal computer, a handheld device, a workstation, client, server, etc. In addition, computer system 12 could be implemented as a stand-alone system, or as part of a computerized network such as the Internet, local area network (LAN), wide area network (WAN), virtual private network (VPN), etc. In the case of the former, program code 14 and messages 16 could be provided to computer system 12 on a recordable medium such as a diskette or CD-ROM (e.g., by a developer 15). In the case of the latter, program code 14 and messages 16 could be made available to computer system 12 over the network (e.g., via e-mail, file sharing, etc.). Furthermore, if implemented within a network, computer system 12 could represent a client or a server. As known, communication between clients and a server could occur via a direct hard-wired connection (e.g., serial port), or via an addressable connection that may utilize any combination of wireline and/or wireless transmission methods. The server and the clients may utilize conventional network connectivity, such as Token Ring, Ethernet, WiFi or other conventional communications standards. Moreover, connectivity could be provided by conventional TCP/IP sockets-based protocol. In this instance, the clients could utilize an Internet service provider to establish connectivity to the server.

Regardless of its implementation, as shown computer system 12 comprises central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and computer system. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, handheld device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., database) capable of providing storage for information under the present invention. Such information could include, for example, program code, messages, stored resources such as rules, policies and the like containing message review parameters, files containing results of message analysis, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Furthermore, although not shown, additional components, such as cache memory, communication systems, system software, etc., may be incorporated into computer system 12.

Referring now to FIG. 2, the functions of message review system 18 will be described in greater detail. As depicted, message review system 18 includes standard configuration system 40, message configuration system 42, notification system 49 and message analysis system 50. Standard configuration system 40 provides the mechanism by which the standard for reviewing messages is defined. Specifically, standard configuration system 40 could spawn a standards interface (not shown) or the like through which developers 15 (FIG. 1) can designate certain stored resources such as policies, rules, etc. (e.g., within storage unit 30) that contain the parameters for reviewing messages. Such parameters could include, for example, character/line limits. Standard configuration system 40 could also allow for dictionaries, glossaries or other reference resources to be provided or designated. Still yet, standard configuration system 40 could allow developers 15 to manually define desired review parameters. Regardless of the scenario, standard configuration system 40 is used to define the standard by which messages 16 will be reviewed.

Message configuration system 42 provides the mechanism by which a message is provided for review under the present invention. To this extent, message configuration system 42 includes a message creation system 44 that allows new messages to be created for subsequent review under the present invention. Further, message configuration system 42 also includes a message edit system 46 that allows existing messages to be edited and subsequently reviewed under the present invention. A message deletion system 48 can also be provided within message configuration system 42 to allow existing messages to be deleted. In general, a message that is deleted need not be reviewed under the present invention. In any event, these systems will be further described below in conjunction with FIGS. 3A-B, 4A-B and 5A-B.

Using the review standard that has been configured via standard configuration system 40, any provided messages 16 can be automatically reviewed by message analysis system 50. Specifically, message analysis system 50 will analyze messages 16 based on the configured review standard, and output any errors in the result interface 32. For example, if a message went over the defined limit of lines or contained a spelling error, these would be indicated as errors in result interface 32. Using the result interface 32, developers 15 can than address the errors (e.g., delete text, correct the spelling error, etc.).

Figure 3A:
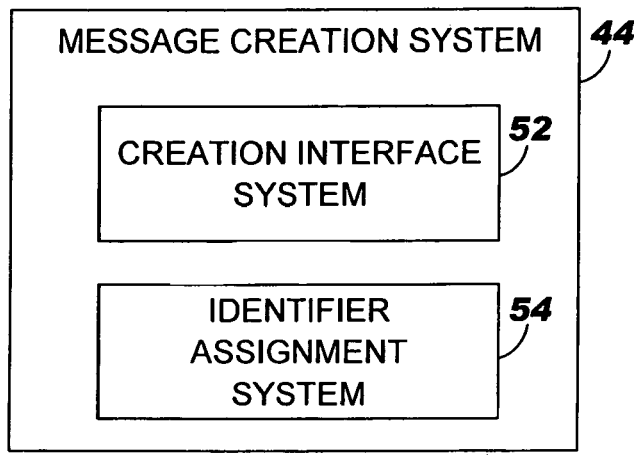
FIG. 3A depicts the message creation system of FIG. 2. in greater detail.
Figure 3B:
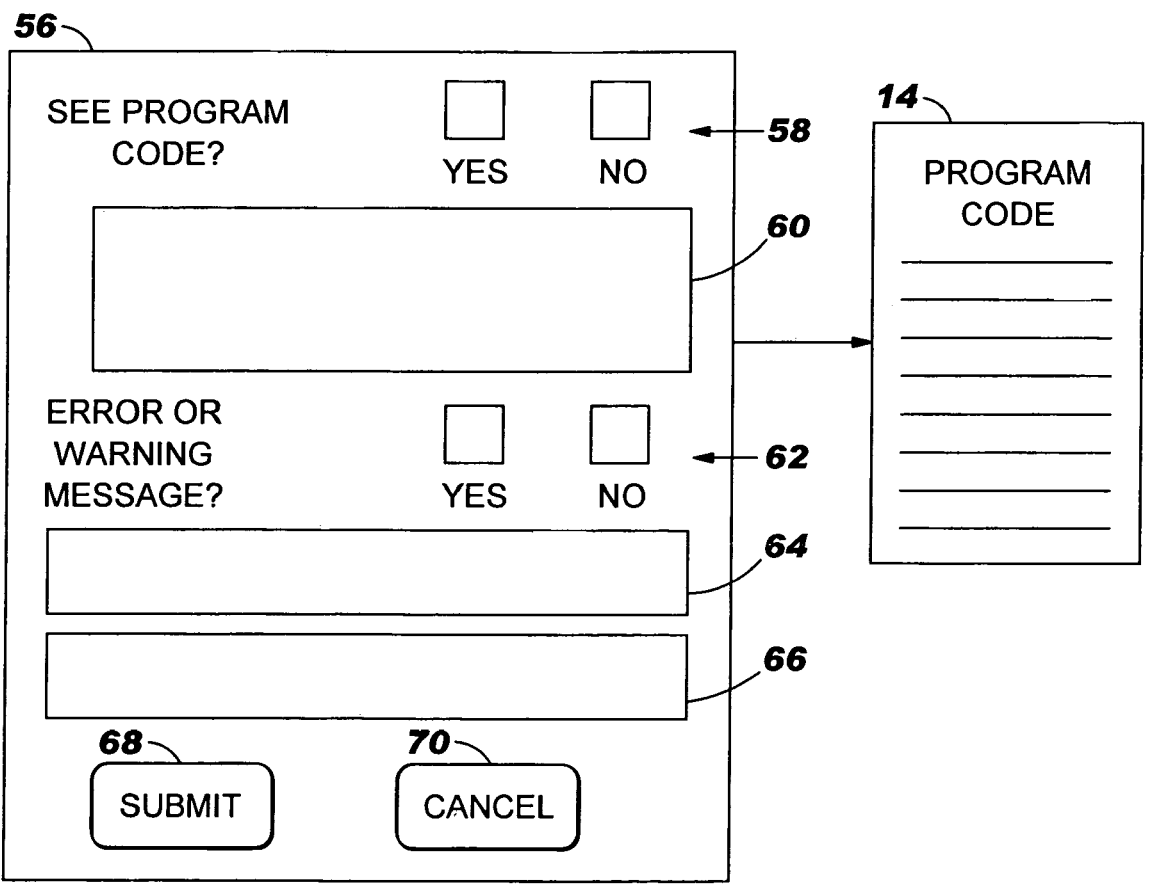
FIG. 3B depicts the message creation interface as generated by the message creation system of FIG. 3A.

Referring now to FIGS. 3A-B, the functions of message creation system 44 will be described in greater detail. As depicted, message creation system 44 includes creation interface system 52 and identifier assignment system 54. When a developer desires to create a new message, creation interface system 52 will spawn creation interface 56, which is shown in FIG. 3B. As shown, creation interface 56 includes check boxes (or the like) 58 for the developer to indicate whether he/she wishes to view creation interface 56 concurrently with the program code 14 associated with the new message being created. If so, the program code 14 can be displayed with creation interface 56 in a split screen or the like. To create a new message, the developer will input text into message input field 60. Message type boxes 62 allow the developer to designate whether the new message is an error or a warning message. If so, the developer could input an explanation for the error or warning message in explanation field 64, and a suggested response by the end-user in suggested response field 66. If the box is not checked, it could be presumed that the new message is an information message. Once all information has been input, the developer can select the submit button 68 to complete the creation process, or the cancel button 70 to cancel the creation process. It should be understood that although not shown, creation interface 56 could include "radio buttons" that allow the developer to select previously drafted template language for message input field 60, explanation field 64 and/or suggested response field 66. Providing this option helps to further the message uniformity provided under the present invention.

If submit button 68 is selected, identifier assignment system 54 of FIG. 3A will assign a unique identifier to the new message, and then save the new message according to the unique identifier. Specifically, under the present invention all messages 16 (FIG. 1) are typically catalogued/stored according to a unique identifier. This allows the messages to be individually identified for future reference. Thereafter, notification system 49 (FIG. 2) could optionally send notifications to a distribution list of appropriate parties such as other developers, supervisors, etc., as stored in storage unit 30 (FIGS. 1 and 2). In any event, once the new message has been created, message analysis system 50 of FIG. 2 will analyze the new message as described above. In particular, the new message will be analyzed based on the configured review standard for any errors. If no errors are present, or once any errors are corrected, the message can be cleared for use with program code 14.

Figure 4A:
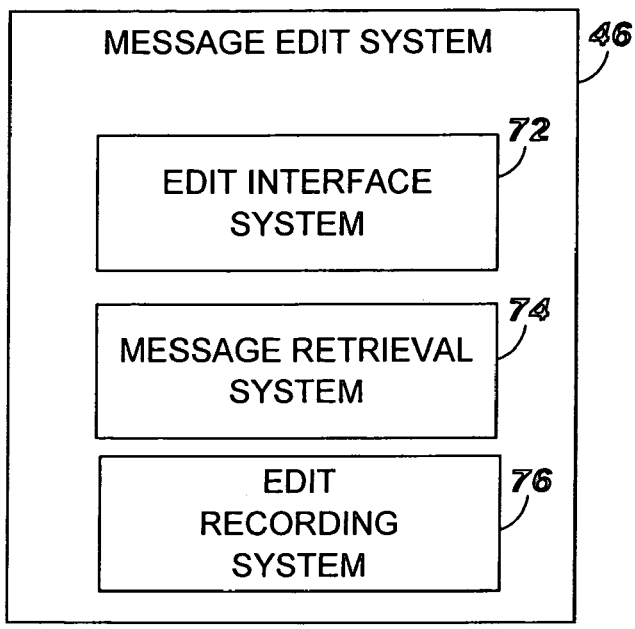
FIG. 4A depicts the message edit system of FIG. 2 in greater detail.
Figure 4B:
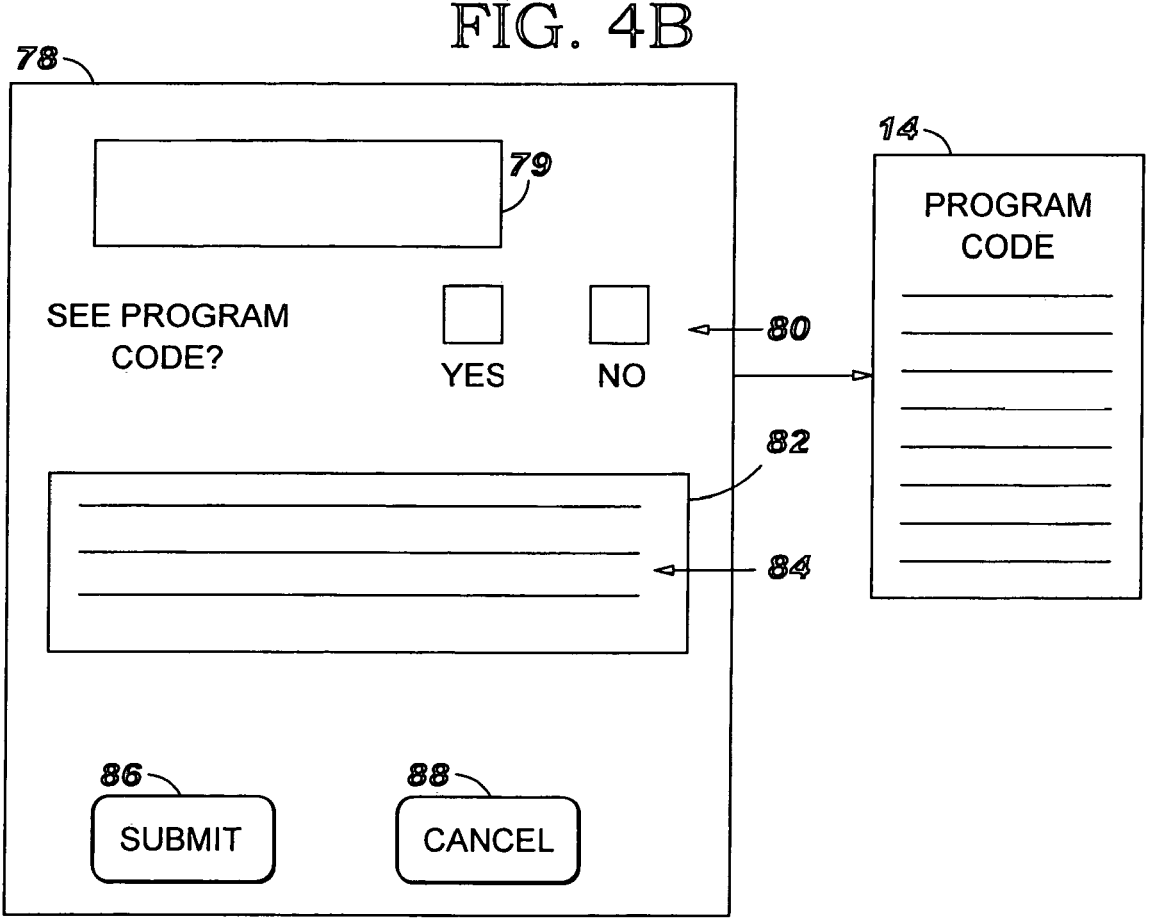
FIG. 4B depicts the message edit interface as generated by the message creation system of FIG. 4A.

Referring now to FIGS. 4A-B, the functions of message edit system 46 will be described in greater detail. As shown, message edit system 46 includes edit interface system 72, message retrieval system 74 and edit recording system 76. If a developer wishes to edit a message, edit interface system 72 will spawn edit interface 78 of FIG. 4B. Once spawned, the developer should indicate which existing message he/she wishes to edit. Accordingly, the developer will input the unique identifier corresponding to the desired message in identifier field 79. For example, if developer 15 wishes to edit message "A," he/she will input the unique identifier that corresponds to message "A." Thereafter, message retrieval system 74 of FIG. 4A will use the unique identifier to locate and retrieve/obtain the message from storage. The content 84 of the message will be displayed for the developer in message field 82. Using message field 82, the developer can then make any desired changes to the message. Upon completion, the developer can select submit button 86 to finalize the edit process, or the cancel button 88 to cancel the edit process. If submit button 86 is selected, edit recording system 76 will record the edited message according to its unique identifier. Thereafter, notification system 49 (FIG. 2) could optionally send notifications to the distribution list, and message analysis system 50 (FIG. 2) will analyze the edited message based on the review standards to determine if any errors are present. As indicated above, any such errors can be represented to the developer in the review interface. As further shown in FIG. 4B, similar to creation interface 56 of FIG. 3B, edit interface 78 also includes check boxes for the developer to indicate whether he/she wishes to concurrently view program code 14 associated with the message being edited. If so, program code 14 can be displayed with edit interface 78 in a split screen or the like.

Figure 5A:
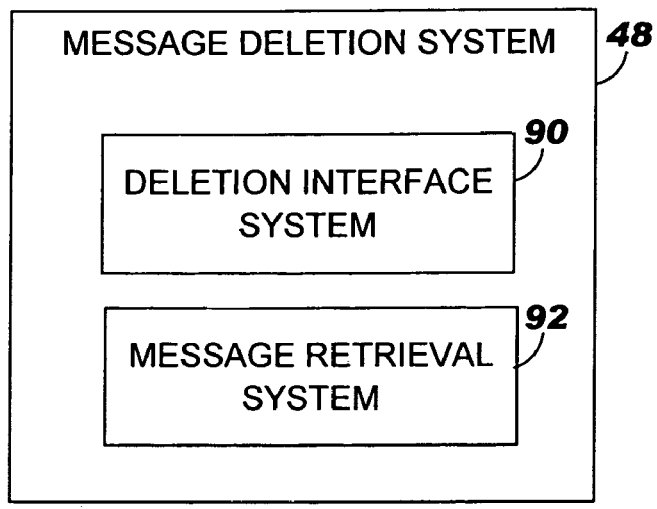
FIG. 5A depicts the message deletion system of FIG. 2 in greater detail.
Figure 5B:
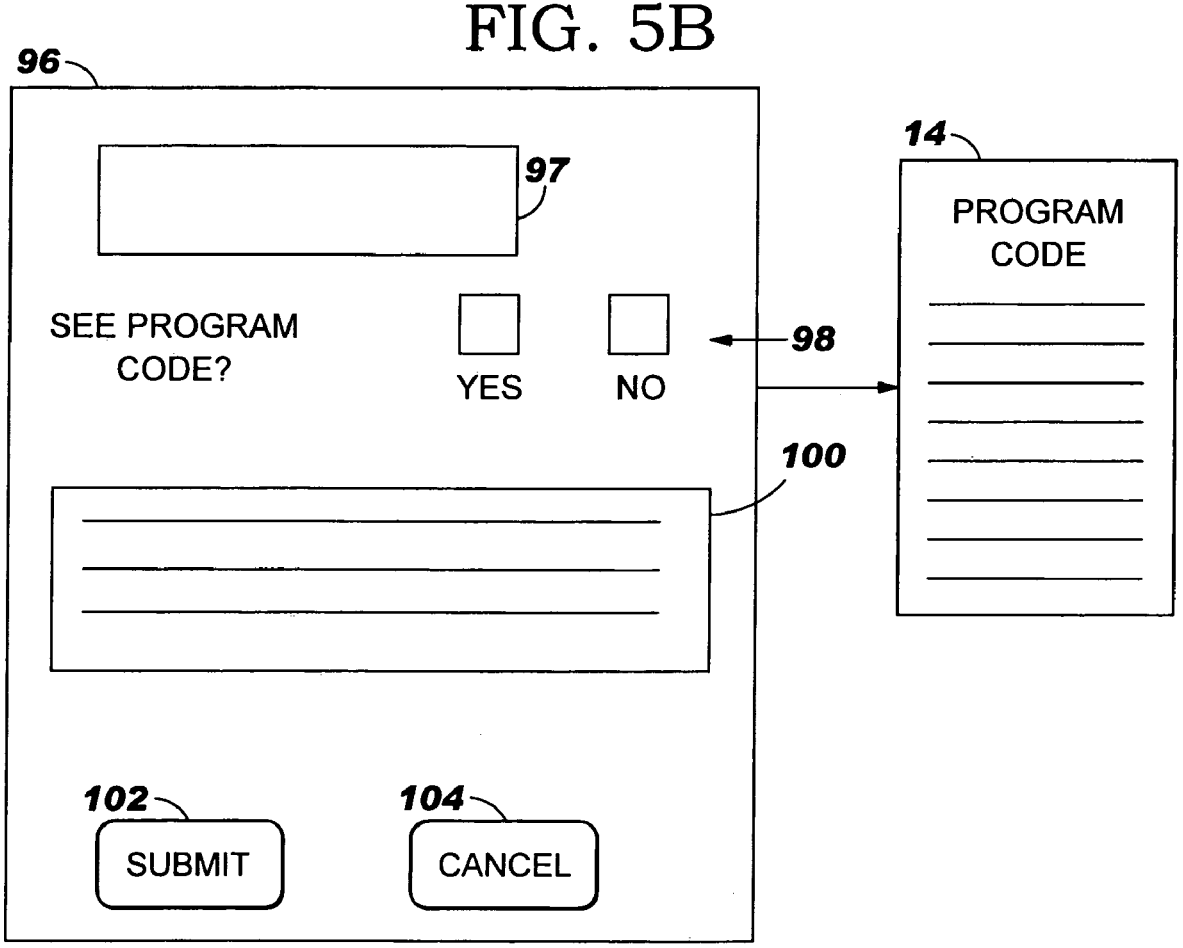
FIG. 5B depicts the message deletion interface as generated by the message creation system of FIG. 5A.

Referring now to FIGS. 5A-B, the functions of message deletion system 48 of FIG. 2 will be described in greater detail. As depicted, message deletion system 48 includes deletion interface system 90 and message retrieval system 92. If a developer wishes to delete an existing message, deletion interface system 90 will spawn deletion interface 96 of FIG. 5B. Similar to edit interface 78 of FIG. 4B, deletion interface 96 includes an identifier field 97 for inputting the unique identifier corresponding to the message wished to be deleted, and a set of check boxes 98 to indicate whether the program code associated with the message to be deleted should be displayed concurrently. Once the unique identifier is input, message retrieval system 92 will retrieve/obtain the corresponding message, and display the same in message field 100. Using buttons 102 or 104, the developer can then decide whether to delete the message or cancel the deletion process. If the deletion button 102 is selected, the message will be deleted and notification will be sent to any involved parties (e.g., supervisors, other developers, etc.) informing them of the deletion via notification system 49 (FIG. 2). Since the message has been deleted, there is little or no need for subsequent review by the message analysis system.

Figure 6:
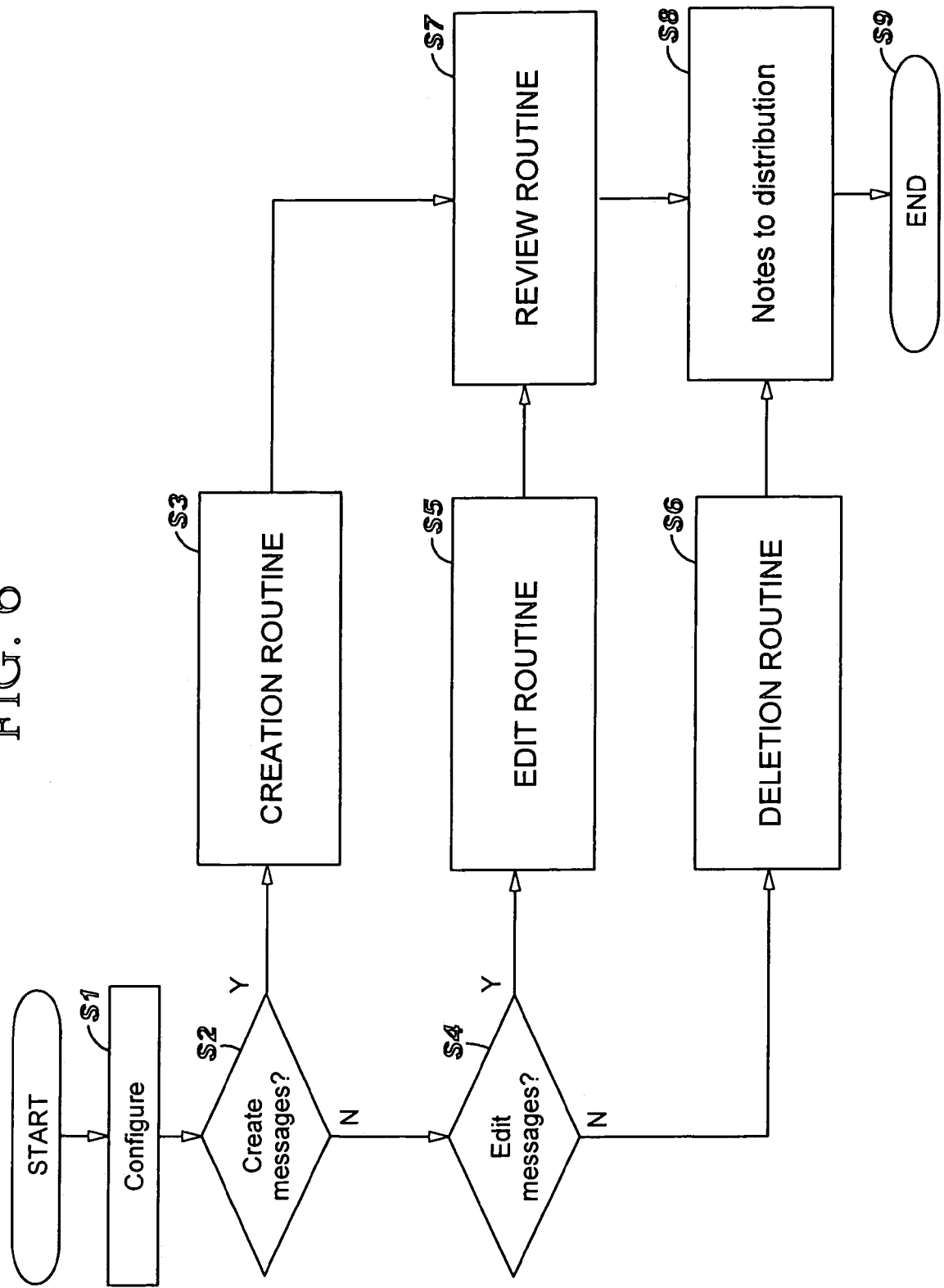
FIG. 6 depicts a flow diagram of a method for reviewing a message associated with computer program code according to the present invention.

Referring now to FIG. 6, a method flow diagram according to the present invention is shown in greater detail. As depicted, the developer will first configure the review standard in step S1. As indicated above, configuration of the review standard can include designating certain stored resources containing review parameters, designating resources such as dictionaries, glossaries and the like, manually designating review parameters, or any combination thereof. In any event, messages can be provided for review based on the review standard. Specifically, in step S2, it is determined whether a new message(s) is being created. If so, the message creation routine is run in step S3. If not, it is determined in step S4 whether an existing message is being edited. If so, the message) edit routine is run in step S5. If, however, a message is neither being created nor being edited, the message deletion routine can be run in step S6, notifications can be sent to a distribution (list) in step S8, and the process will end in step S9. Conversely, any messages resulting from the message creation routine of step S3 or message edit routine of step S5 will be subject to the review routine of step S7 before notifications are sent to the distribution list in step S8 and the process is ended in step S9.

Figure 7:
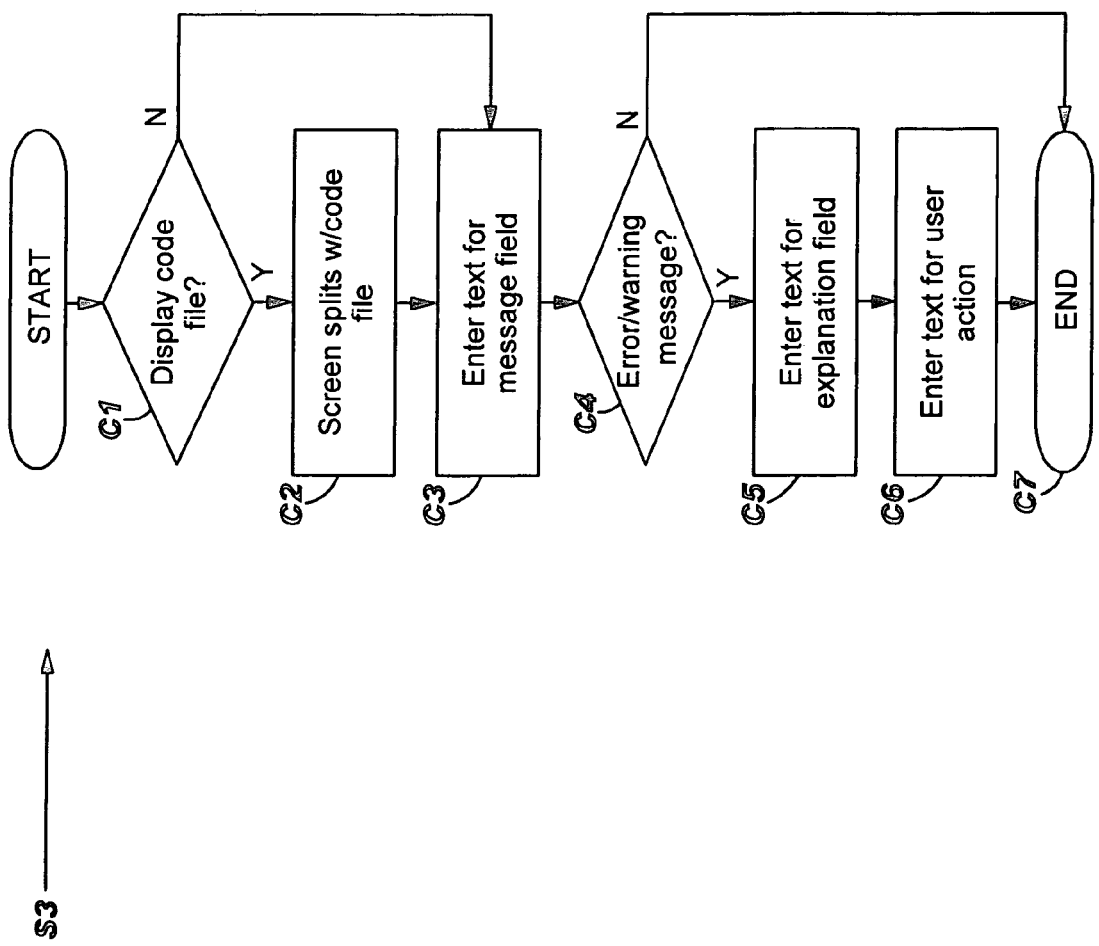
FIG. 7 depicts the message creation routine of FIG. 6.

Referring now to FIG. 7, the message creation routine of step S3 is shown in greater detail. As depicted, in step C1, it is determined whether the program code associated with the new message should be displayed concurrently with the new message. If so, the program code can be displayed in a split screen in step C2. In step C3, new text for the message is entered (e.g., using the creation interface of FIG. 3B). Thereafter, it is determined whether the new message is an error or warning message in step C4. If not, the creation routine is ended in step C7. If, however, the new message is an error or warning message, the developer can enter an explanation in step C5 and a suggested action by the user in step C6 before the process is ended in step C7.

Figure 8:
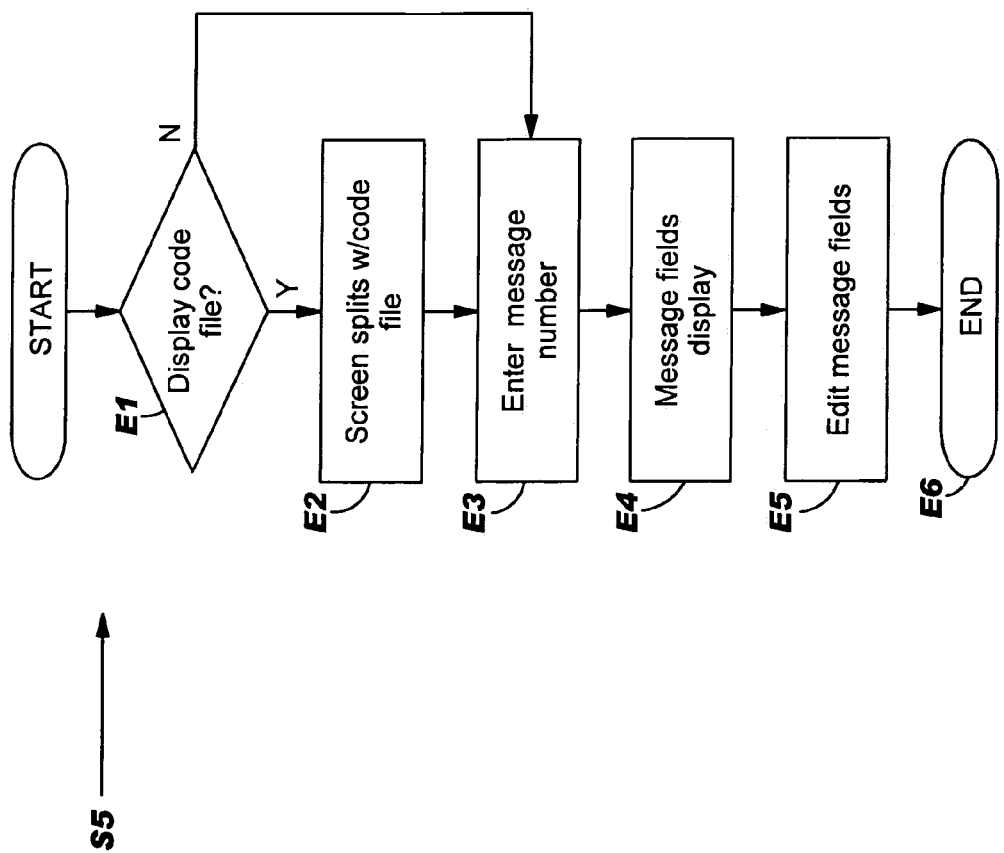
FIG. 8 depicts the message edit routine of FIG. 6.

Referring now to FIG. 8, the message edit routine of step S5 of FIG. 6 is shown in greater detail. As depicted, in step E1, it is determined whether the program code associated with the existing message should be displayed concurrently with the existing message. If so, the program code can be displayed in a split screen in step E2. In step E3, the unique identifier/message number corresponding to the existing message is input and the message is obtained. Thereafter, the message is displayed in step E4 (e.g., in the edit interface of FIG. 4B) for editing in step E5. Once the editing is complete the process is ended in step E6.

Figure 9:
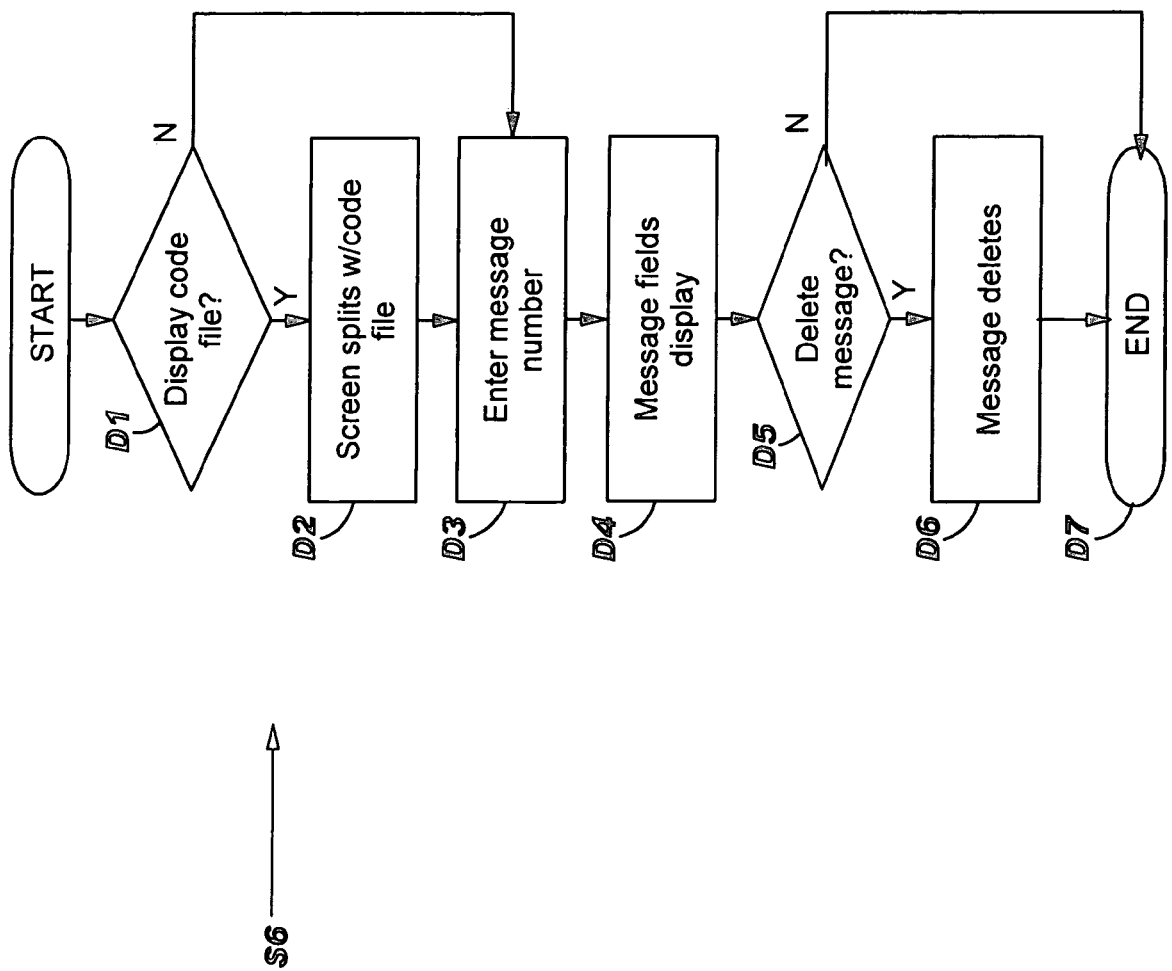
FIG. 9 depicts the message deletion routine of FIG. 6.

Referring now to FIG. 9, the message deletion routine of step S6 of FIG. 6 is shown in greater detail. As depicted, in step D1, it is determined whether the program code associated with the existing message should be displayed concurrently with the existing message. If so, the program code can be displayed in a split screen in step D2. In step D3, the unique identifier/message number corresponding to the existing message is input and the message is obtained. Thereafter, the message is displayed in step D4 (e.g., in the deletion interface of FIG. 5B). In step D5, it is determine whether the message should be deleted. If not, the process is ended in step D8. If, however, the message should be deleted in step D5, the message is formally deleted in step D6. Thereafter, the process is ended in step D7.

Figure 10:
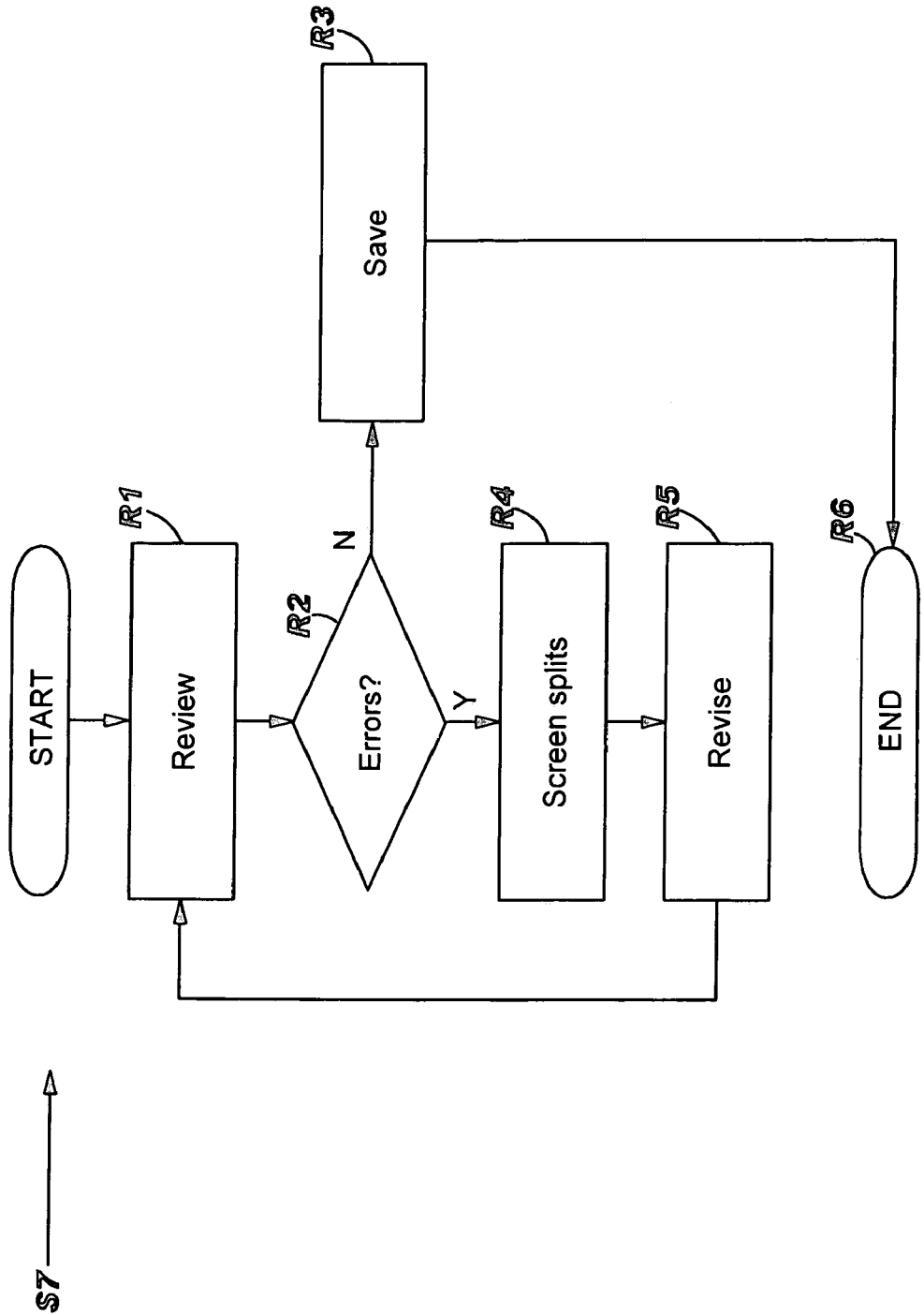
FIG. 10 depicts the message review routine of FIG. 6.

FIG. 10 depicts the review routine of step S7 of FIG. 6 in greater detail. In step R1, the message is reviewed based on the configured review standard. In step R2, it is determined whether any errors are present. If not, the message is saved in step R3. If, however, errors were detected in step R2, they can be displayed for the developer (e.g., in the result interface of FIG. 1) in step R4. As indicated above, the errors can be displayed concurrently with the actual message and/or the associated program code in a split screen or the like. In any event, the errors can be revised in step R5 and the message will be reviewed again in step R1. This process will repeat until no errors are found so that the message can be saved in step R3 and the process ended In step R6.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although not shown, notifications could be sent to a distribution list upon all message reviews, not only upon message deletion. In this case, notifications could be generated and sent by message analysis system 50 of FIG. 2.

I claim:

1. A computer-implemented method for reviewing a message, the method comprising:

providing the message, wherein the message is crafted in a natural language by a developer in association with development of a computer program code and delivered by the computer program code to an end user in response to an event during execution of the computer program code;

configuring a review standard for reviewing linguistic aspects of the natural language used in crafting the message, wherein the review standard includes review parameters selected from a group consisting of: character limits, line limits, spell checks, grammar checks and a combination thereof;

reviewing the message, during development of the computer program code, based on the review standard to detect errors;

displaying any errors that are detected concurrently with the message; and revising the message to address the errors.

2. The method of claim 1, wherein the providing comprises creating a new message.

3. The method of claim 2, wherein the creating comprises:

inputting text for the new message using a message creation interface;

designating whether the new message is an error message, a warning message, or an information message;

inputting an explanation and a suggested user action using the message creation interface if the new message is an error message or a warning message;

assigning a unique identifier to the new message; and sending a notification pertaining to the new message.

4. The method of claim 3, further comprising displaying the computer program code associated with the new message concurrently with the text for the new message.

5. The method of claim 1, wherein the providing comprises editing an existing message.

6. The method of claim 5, wherein the editing comprises:
inputting a unique identifier corresponding to the existing message;
obtaining the existing message based on the unique identifier;
displaying the existing message in a message edit interface;
editing the existing message in the message edit interface; and
sending a notification pertaining to the edited existing message.

7. The method of claim 6, further comprising displaying the computer program code associated with the existing message concurrently with the existing message.

8. The method of claim 1, wherein the review parameters for ascertaining a structure of a message are retrieved from a saved resource.

9. The method of claim 1, wherein the review parameters are manually designated.

10. The method of claim 1, wherein the message and the errors are displayed concurrently with the computer program code associated with the message.

11. A computerized system for reviewing a message delivered to an end user, the system, comprising: a processor;
a message configuration system for configuring the message, wherein the message is crafted in a natural language by a developer in association with development of a computer program code and delivered by the computer program code to an end user in response to an event during execution of the computer program code;
a standard configuration system for configuring a review standard for reviewing linguistic aspects of the natural language used in crafting the message, wherein the review standard includes review parameters selected from a group consisting of: character limits, line limits, spell checks, grammar checks and a combination thereof; and
a message analysis system for reviewing the message, during development of the computer program code, based on the review standard to detect any errors, and for displaying the errors if detected.

12. The system of claim 11, wherein the message is a new message, and wherein the message configuration system comprises a message creation system for creating the new message.

13. The system of claim 12, wherein the message creation system comprises:
a creation interface system for providing a message creation interface for inputting text for the new message and an explanation and a suggested user action if the new message is an error message or a warning message; and
an identifier assignment system for assigning a unique identifier to the new message, and for saving the new message according to the unique identifier.

14. The system of claim 13, wherein the message creation interface further displays the computer program code associated with the new message concurrently with the new message.

15. The system of claim 11, wherein the message is an existing message, and wherein the message configuration system comprises a message edit system.

16. The system of claim 15, wherein the message edit system comprises:
a message retrieval for receiving a unique identifier corresponding to the existing message, and for obtaining the existing message based on the unique identifier;
an edit interface system for providing a message edit interface for editing the existing message once obtained; and
an edit recording system for saving the edited existing message according to the unique identifier.

17. The system of claim 16, wherein the message edit interface further displays the computer program code associated with the existing message concurrently with the existing message.

18. The system of claim 11, wherein the message configuration system comprises a message deletion system that comprises:
a message retrieval system for receiving a unique identifier corresponding to a particular message, and for obtaining the particular message based on the unique identifier; and
a deletion interface system for providing a message deletion interface for deleting the particular message once obtained.

19. The system of claim 11, wherein the review parameters for ascertaining a structure of a message are retrieved from a saved resource.

20. The system of claim 11, wherein the review parameters are manually designated.

21. The system of claim 11, wherein the message and the errors are displayed concurrently.

22. A program product stored on a recordable medium for reviewing a message, comprises:
program code for configuring the message, wherein the message is crafted in a natural language by a developer in association with development of a computer program code and delivered by the computer program code to an end user in response to an event during execution of the computer program code;
program code for configuring a review standard for reviewing linguistic aspects of the natural language used in crafting the message, wherein the review standard includes review parameters selected from a group consisting of: character limits, line limits, spell checks, grammar checks and a combination thereof; and
program code for reviewing the message, during development of the computer program code, based on the review standard to detect any errors, and for displaying the errors if detected.

23. The program product of claim 22, wherein the message is a new message, and wherein the program code for configuring the message comprises program code for creating the new message.

24. The program product of claim 23, wherein the program code for creating the new message comprises:
program code for providing a message creation interface for inputting text for the new message and an explanation and a suggested user action if the new message is an error message or a warning message; and
program code for assigning a unique identifier to the new message, and for saving the new message according to the unique identifier.

25. The program product of claim 24, wherein the message creation interface further displays the computer program code associated with the new message concurrently with the new message.

26. The program product of claim 22, wherein the message is an existing message, and wherein the program code for configuring the message comprises program code for editing the existing message.

27. The program product of claim 26, wherein the program code for editing the existing message comprises:
program code for receiving a unique identifier corresponding to the existing message, and for obtaining the existing message based on the unique identifier; and
program code for providing a message edit interface for editing the existing message once obtained; and program code for saving the edited existing message according to the unique identifier.

28. The program product of claim 27, wherein the message edit interface further displays the computer program code associated with the existing message concurrently with the existing message.

29. The program product of claim 22, wherein the program code for configuring the message comprises program code for deleting an existing message that comprises:

program code for receiving a unique identifier corresponding to an existing message, and for obtaining the existing message based on the unique identifier; and program code for providing a message deletion interface for deleting the existing message once obtained.

30. The program product of claim 22, wherein the review parameters for ascertaining a structure of a message are retrieved from a saved resource.

31. The program product of claim 22, wherein the review parameters are manually designated.

32. The program product of claim 22, wherein the message and the errors are displayed concurrently.

* * * * *